(12) United States Patent
Lev Ran et al.

(10) Patent No.: US 11,570,178 B2
(45) Date of Patent: Jan. 31, 2023

(54) METHOD AND SYSTEM FOR CHECKING PERMISSIONS COMPATIBILITY BETWEEN A CONFIGURATION MANAGEMENT SYSTEM AND AN ORCHESTRATION SYSTEM OF A COMPUTING CLUSTER

(71) Applicant: International Business Machines Corporation, Armonk, NY (US)

(72) Inventors: Etai Lev Ran, Nofit (IL); Alexey Roytman, Givat Ella (IL); Zvi Cahana, Naharia (IL); Idan Zach, Givat Ella (IL); Michal Malka, Moreshet (IL); Vita Bortnikov, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 17/079,531

(22) Filed: Oct. 26, 2020

(65) Prior Publication Data

US 2022/0131865 A1   Apr. 28, 2022

(51) Int. Cl.
*H04L 9/40* (2022.01)
*H04L 41/0869* (2022.01)

(52) U.S. Cl.
CPC ........ *H04L 63/102* (2013.01); *H04L 41/0869* (2013.01)

(58) Field of Classification Search
CPC ....... G06N 20/00; G06F 9/5072; G06F 16/00; G06F 16/178; G06F 9/45558; G06F 9/5061; G06F 16/90335; G06F 21/629; H04L 63/14; H04L 63/0823; H04L 41/0869; H04L 41/0893; H04L 41/0895; H04L 63/0281; H04L 67/10
See application file for complete search history.

(56) References Cited

U.S. PATENT DOCUMENTS 10,037,204 B2 * 7/2018 Patton ..................... G06F 16/00
11,080,410 B1 * 8/2021 Sandall ................. G06F 21/629
(Continued)

OTHER PUBLICATIONS

Block. "OpenShift Authentication Integration with ArgoCD", Published in: Red Hat Openshift, Jan. 9, 2020, 11 pages.
(Continued)

*Primary Examiner* — Dustin Nguyen
(74) *Attorney, Agent, or Firm* — G.E. Ehrlich

(57) ABSTRACT

A method and a system for checking permissions compatibility between a configuration management system and an orchestration system of a computing cluster are disclosed. The method comprises: identifying a request to approve a change in at least one file of the computing cluster. Retrieving from a repository of the configuration management system an identity of a user for performing the change. Acquiring a denial response or an approval response received in response to a query provisioned to the orchestration system, the query is for rights to change the at least one file using the identity of the user. In response to the approval response, entering the approval response, into the configuration management system for confirming the checking permissions compatibility is approved. In response to the denial received, sending a message to the configuration management system, the message is indicative that the checking permissions compatibility is not approved.

20 Claims, 4 Drawing Sheets

(56) References Cited

U.S. PATENT DOCUMENTS

| | | | |
|---|---|---|---|
| 11,108,629 B1* | 8/2021 | Cahyadi | G06F 9/45558 |
| 2011/0126047 A1* | 5/2011 | Anderson | H04L 63/14 |
| | | | 709/224 |
| 2015/0264122 A1* | 9/2015 | Shau | G06F 9/5061 |
| | | | 709/203 |
| 2017/0257432 A1* | 9/2017 | Fu | H04L 67/10 |
| 2018/0137032 A1 | 5/2018 | Tannous | |
| 2018/0324204 A1* | 11/2018 | McClory | H04L 63/0281 |
| 2019/0190776 A1* | 6/2019 | Bregman | H04L 41/0869 |
| 2019/0243979 A1* | 8/2019 | De Gaetano | G06N 20/00 |
| 2020/0348984 A1* | 11/2020 | Giannetti | G06F 9/5072 |
| 2021/0185093 A1* | 6/2021 | Pollitt | H04L 41/0893 |
| 2021/0200814 A1* | 7/2021 | Tal | G06F 16/90335 |
| 2021/0311760 A1* | 10/2021 | Oki | H04L 41/0895 |
| 2022/0053001 A1* | 2/2022 | Shipkovenski | H04L 63/0823 |

OTHER PUBLICATIONS

Kelly, "The GitOps Kubernetes Connection", Feb. 28, 2020, 13 pages.

Kubernetes Engine Tutorials, "GitOps-style Continuous Delivery with Cloud Build", 13 pages.

Weave Works. "GitOps Part 4—Application Delivery Compliance and Secure CICD", Feb. 22, 2018, 10 pages.

* cited by examiner

METHOD AND SYSTEM FOR CHECKING PERMISSIONS COMPATIBILITY BETWEEN A CONFIGURATION MANAGEMENT SYSTEM AND AN ORCHESTRATION SYSTEM OF A COMPUTING CLUSTER

TECHNICAL FIELD

The present disclosure, in some embodiments thereof, relates to access control of a versioned configuration of an orchestration system of a computing cluster and, more specifically, but not exclusively, to a method and system for checking permissions compatibility between a configuration management system and an orchestration system of a computing cluster.

BACKGROUND

Containers technology is based on packaging applications to run with isolated dependencies. Containers have fundamentally altered the development of software today due to their compartmentalization of a computer system.

Containers offer a logical packaging mechanism in which applications may be abstracted from a target environment in which they actually run. This decoupling allows container-based applications to be deployed easily and consistently, regardless of whether the target environment is a private data center, a public cloud, or even a personal laptop of a developer. Containerization provides a clean separation of concerns, as developers focus on their application logic and dependencies, while information technology (IT) operations teams may focus on application deployment and management without bothering with application details such as specific software versions and configurations specific to the application (app).

Containers allow to package an application and its dependencies together into one unit that may be version controlled, allowing for easy replication of the application across developers on a team and machines in a cluster.

Combined with a service-based architecture, the entire unit that developers are asked to reason about becomes much smaller, leading to greater agility and productivity. All this eases development, testing, deployment, and overall management of applications.

Container orchestration is a management system, which manages the lifecycles of containers, especially in large, dynamic environments (such as complex cloud environments). Versioning management system (also related to as version control systems) are a category of software tools that help a software team manage changes to-source code over time. Version control software keeps track of every modification to the code in a special kind of database. If a development inaccuracy is made, developers may turn back and compare earlier versions of the code to help fix the inaccuracy while minimizing disruption to all team members.

SUMMARY

It is an object of the present disclosure to describe a system and a method for checking permissions compatibility between a configuration management system and an orchestration system of a computing cluster.

The foregoing and other objects are achieved by the features of the independent claims. Further implementation forms are apparent from the dependent claims, the description and the figures.

In one aspect, the present disclosure relates to a method for checking permissions compatibility between a configuration management system and an orchestration system of a computing cluster. The method comprises:

identifying a request to approve at least one change in at least one file defining a configuration of the computing cluster;

retrieving from a repository of the configuration management system identity of a user for performing the at least one change;

acquiring a denial response or an approval response received in response to a query provisioned to the orchestration system, the query is for rights to change the at least one file using the identity of the user;

in response to the approval response, entering the approval response, into the configuration management system for confirming the checking permissions compatibility is approved;

in response to the denial received, sending a message to the configuration management system, the message is indicative that the checking permissions compatibility is not approved.

In a further implementation of the first aspect, the method further comprises:

analyzing the at least one changed file to detect objects and operations affected by the change; and checking permissions compatibility against the orchestration system, by accessing the orchestration system to verify that the retrieved user identity is authorized to perform the change in the orchestration system and to apply the objects and operations affected by the performed change.

In a further implementation of the first aspect, the method further comprising:

mapping between user names of the configuration management system and user names of the orchestration system of the computing cluster for checking permissions compatibility between the configuration management system and the orchestration system of the computing cluster.

In a further implementation of the first aspect, the configuration management system is a versioning management system.

In a further implementation of the first aspect, the configuration management system is Git.

In a further implementation of the first aspect, the orchestration system of the computing cluster is Kubernetes.

In a further implementation of the first aspect, the configuration management system is a part of the computing cluster.

In a further implementation of the first aspect, in response to the denial received, sending a message to the configuration management system, comprises one of the following:

notifying the user by a user interface that the at least one change is not approved;

replying to the request to approve the change with a comment or with a request for changes, which matches the permissions check compatibility; or adding a results file.

In a further implementation of the first aspect, the method further comprising:

in response to an approval received from the orchestration system of the computing cluster for the user to perform the at least one change, applying the at least one change to the computing cluster.

In a further implementation of the first aspect, identifying the request to approve the at least one change in the at least one file is done during a change review flow of the configuration management system.

In a further implementation of the first aspect, when a query provisioned to the orchestration system, for rights to perform multiple changes at the at least one file, and part of the changes are approved and part of the changes are denied, applying the approved part of changes to the computing cluster and notifying the user by a user interface about the part of changes that are denied.

In a second aspect, the present disclosure relates to a server with at least one processor executing a method for checking permissions compatibility between a configuration management system and an orchestration system of a computing cluster, configured to:

identify a request to approve at least one change in at least one file defining a configuration of the computing cluster;

retrieve from a repository of the configuration management system identity of a user for performing the at least one change;

acquire a denial response or an approval response received in response to a query provisioned to the orchestration system, the query is for rights to change the at least one file using the identity of the user;

in response to the approval response, enter the approval response, into the configuration management system for confirming the checking permissions compatibility is approved; and in response to the denial received, send a message to the configuration management system, the message is indicative that the checking permissions compatibility is not approved.

In a further implementation of the second aspect, the server is further configured to:

analyze the at least one changed file to detect objects and operations affected by the change; and check permissions compatibility against the orchestration system, by accessing the orchestration system to verify that the retrieved user identity is authorized to perform the change in the orchestration system and to apply the objects and operations affected by the performed change.

In a further implementation of the second aspect, the server is further configured to:

map between user names of the configuration management system and user names of the orchestration system of the computing cluster for checking permissions compatibility between the configuration management system and the orchestration system of the computing cluster.

In a further implementation of the second aspect, the at least one processor executes the method for checking permissions compatibility between a configuration management system and an orchestration system of a computing cluster as part of the configuration management system.

In a further implementation of the second aspect, the at least one processor executes the method for checking permissions compatibility between a configuration management system and an orchestration system of a computing cluster as part of a Continuous Integration Continuous Deployment (CICD) system.

In a further implementation of the second aspect, the at least one processor executes the method for checking permissions compatibility between a configuration management system and an orchestration system of a computing cluster as part of the computer cluster.

In a third aspect, the present disclosure related to a computer program product for checking permissions compatibility between a configuration management system and an orchestration system, the computer program product comprising:

one or more computer readable storage media, and program instructions collectively stored on the one or more computer readable storage media, the program instructions comprising:

program instructions to identify a request to approve at least one change in at least one file defining a configuration of the computing cluster;

program instructions to retrieve from a repository of the configuration management system identity of a user for performing the at least one change;

program instructions to acquire a denial response or an approval response received in response to a query provisioned to the orchestration system, the query is for rights to change the at least one file using the identity of the user;

in response to the approval response, program instructions to enter the approval response, into the configuration management system for confirming the checking permissions compatibility is approved; and in response to the denial received, program instructions to send a message to the configuration management system, the message is indicative that the checking permissions compatibility is not approved.

In a further implementation of the third aspect, the computer program product further comprises:

program instructions to analyze the at least one changed file to detect objects and operations affected by the change; and program instructions to check permissions compatibility against the orchestration system, by accessing the orchestration system to verify that the retrieved user identity is authorized to perform the change in the orchestration system and to apply the objects and operations affected by the performed change.

In a further implementation of the third aspect, the computer program product further comprises program instructions to map between user names of the configuration management system and user names of the orchestration system of the computing cluster for checking permissions compatibility between the configuration management system and the orchestration system of the computing cluster.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
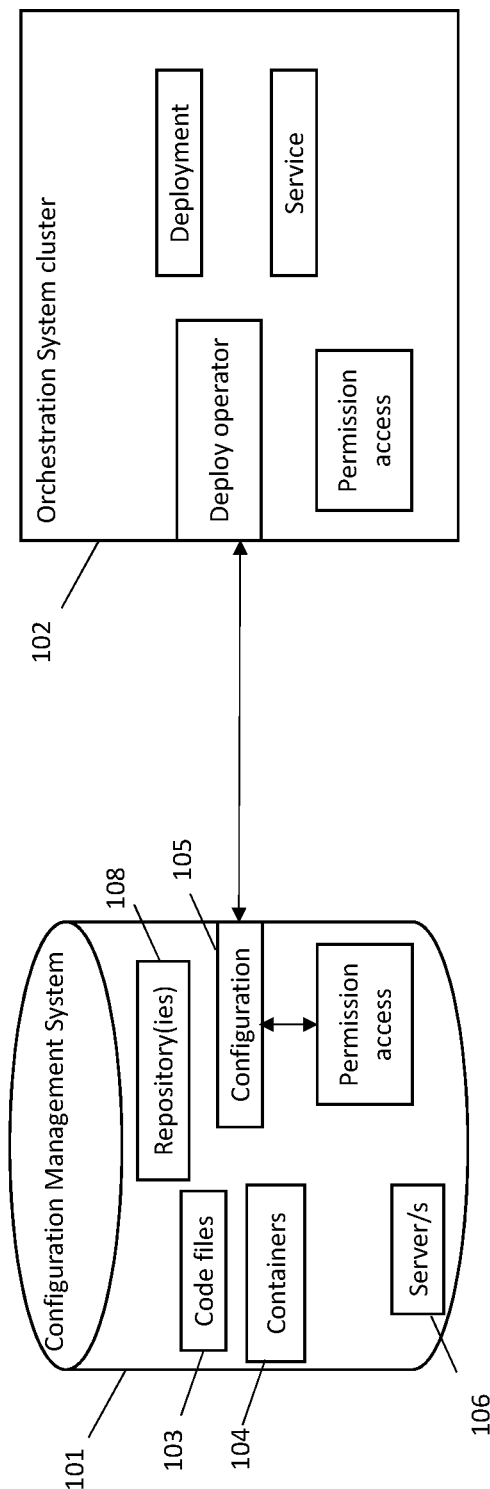
FIG. 1 schematically shows the interaction between a configuration management system and an orchestration system.

The present disclosure, in some embodiments thereof, relates to access control of a versioned configuration of an orchestration system of a computing cluster and, more specifically, but not exclusively, to a method and system for checking permissions compatibility between a configuration management system and an orchestration system of a computing cluster.

Orchestration systems are important for operating containers at scale on any public or private cloud or computing cluster. Deploying and updating applications to an orchestration system combines a container image, which is the application code, with a deployment configuration e.g., derived Pod definitions in a YAML file, referencing the container image. From a security and compliance perspective, both code and configuration changes should be audited and versioned.

Configuration management system is a system for ensuring that all software and hardware assets, which a company owns, are known and tracked at all times so that any future changes to these assets are known and tracked. The configuration management system maintains computer systems, servers, and software in a desired, consistent state and it makes sure that a system performs as it is expected to as changes are made over time.

A versioning management system or version control system is a system that records changes to a file or set of files over time so that specific versions may be recalled later.

An operating model for an orchestration system, which is a cloud native Continuous Integration/Continuous Deployment (CI/CD) model. This model is based on a versioning management system, is a system where all changes and updates to deployment environments happen through changes to version control. Such an operating model provides a set of practices to organize code and configuration for applications and environments in an automated way. Instead of manually configuring an environment, all changes are automatically deployed once they are approved and merged into a new version. The versioning management system with the operating model for the orchestration system are an example for an implementation of a configuration management system.

One of the challenges in configuration management systems, and specifically in operating models for orchestration systems which are based on a versioning management system, is access permissions. Specifically, the configuration management system and the orchestration system permissions are neither aligned nor compatible. The difference is expressed in three aspects: the objects, which are checked, the type of permission checks and the way to perform the permission checks. While the configuration management system managed objects are limited, for example, to repositories and files, the orchestration system manages arbitrary object, which are defined in a much broader way. An example for this difference is clearly expressed in the access permission, defined as permission grant of the configuration management system and the permission check mechanism of the orchestration system. In the configuration management system, access permissions are limited to a few types of access permissions, for example: read-only, read-write and administrator, while the orchestration system has a finer-grained types of permission checks such as list, read, write, delete, update and the like. mechanisms. The configuration management system comprises a permission checks access mechanism, which is build in as part of the configuration management system whereas the orchestration system includes several access permissions mechanisms. The access permissions mechanisms of the orchestration system define models, which allows for a wide variety of access permissions per user, per objects and per operation and the like.

Due to this difference, some of the configuration and/or versioning managements based operating models for orchestration systems define their own access model, independent of the configuration and/or versioning management system and the orchestration system. This way, the access permissions are managed internally by the operating model, bypassing the "native" configuration and/or versioning management system and orchestration system access controls. This renders the orchestration system access permission mechanisms moot and places the burden on the developers or on the operating model.

In order to avoid rendering the orchestration system access permission mechanisms moot and placing the burden on the developers, some versioning management based operating models have decided to separate the versioning management flow (e.g., commit and merge) from the orchestration system, and delay permission checks to deployment time. This has a downside where approved changes in the versioning management system could potentially fail on deployment due to missing permissions.

Another solution is to allow all approved changes and apply them to the orchestration system using a single all-powerful user account operated by the operating model, however this also renders the orchestration system access permission mechanisms moot.

Other alternatives try to map between, for example, the user access permissions of the versioning management system and the orchestration access permissions. However, when mapping is not a simple one to one mapping, this does not work.

It is therefore desired to provide a solution for checking permission compatibility between a configuration management system and an orchestration system of a computing cluster. The present disclosure describes a system that maintains the orchestration system access permissions mechanism/s and integrates it into a change review flow of the configuration management system. The present disclosure describes a system and a method where permission checks are done as part of a change review flow and against permissions defined in the orchestration system. A change review flow is a process where changes in code files and/or configuration files are tested both automatically by running CI/CD tests and by being checked by other users, which review the changes to verify the changes are accurate, before the changes are merge to a main code file. Thus, the changes are guaranteed to be compatible with the cluster state and permissions. Permission checks support the orchestration system full capabilities and access permission mechanism (e.g., per object type access, per user, per operation and the like) and do not require complex emulation, which takes a lot of computational power and can be inaccurate with respect to the system being emulated. Permissions and users are maintained in a single place which allows to perform version control to users and permissions as well while all is managed declaratively via configuration objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer and/or computerized device, partly on the user's computer and/or computerized device, as a stand-alone software package, partly on the user's computer (and/or computerized device) and partly on a remote computer or entirely on the remote computer or server. In the latter scenario, the remote computer may be connected to the user's computer and/or computerized device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to a FIG. 1, which schematically shows a configuration management system 101 and an interaction of the configuration management system with an orchestration system of a computing cluster 102 (also referred to as orchestration system). The configuration management system 101 includes code files 103 defining a configuration of the computing cluster, stored at a repository 108. The code files 103 include a main code (usually called a master code or master branch) and branches codes, which are sub codes of the master code. When a team works on a code, each user in the team may work on a branch code separately and independently, and after the branch code is ready, the branch code is merged into the master code. Before merging the branch code to the master code the branch code is tested to make-sure it runs correctly with no mistakes, and another user (usually an administrator, a manager, a senior engineer or someone familiar with the code changed or the like), checks the branch code is proper with no mistakes. Every time a user modifies one of the code files 103, the modified code file is executed once a container 104 is built as part of a continuous integration (CI) process for running unit tests and integration tests verifying the code file is fine. After the code file is successfully run and all the tests are approved, a configuration file 105 is updated according to the changed code file, and when the changed code file and the changed configuration file are approved by the other user, the code file, which is a branch code, is merged into the master code. Once the master code is changed, the orchestration system 102 is updated by the configuration management system 101 to run the updated configuration file for the updated master code.

Figure 2:
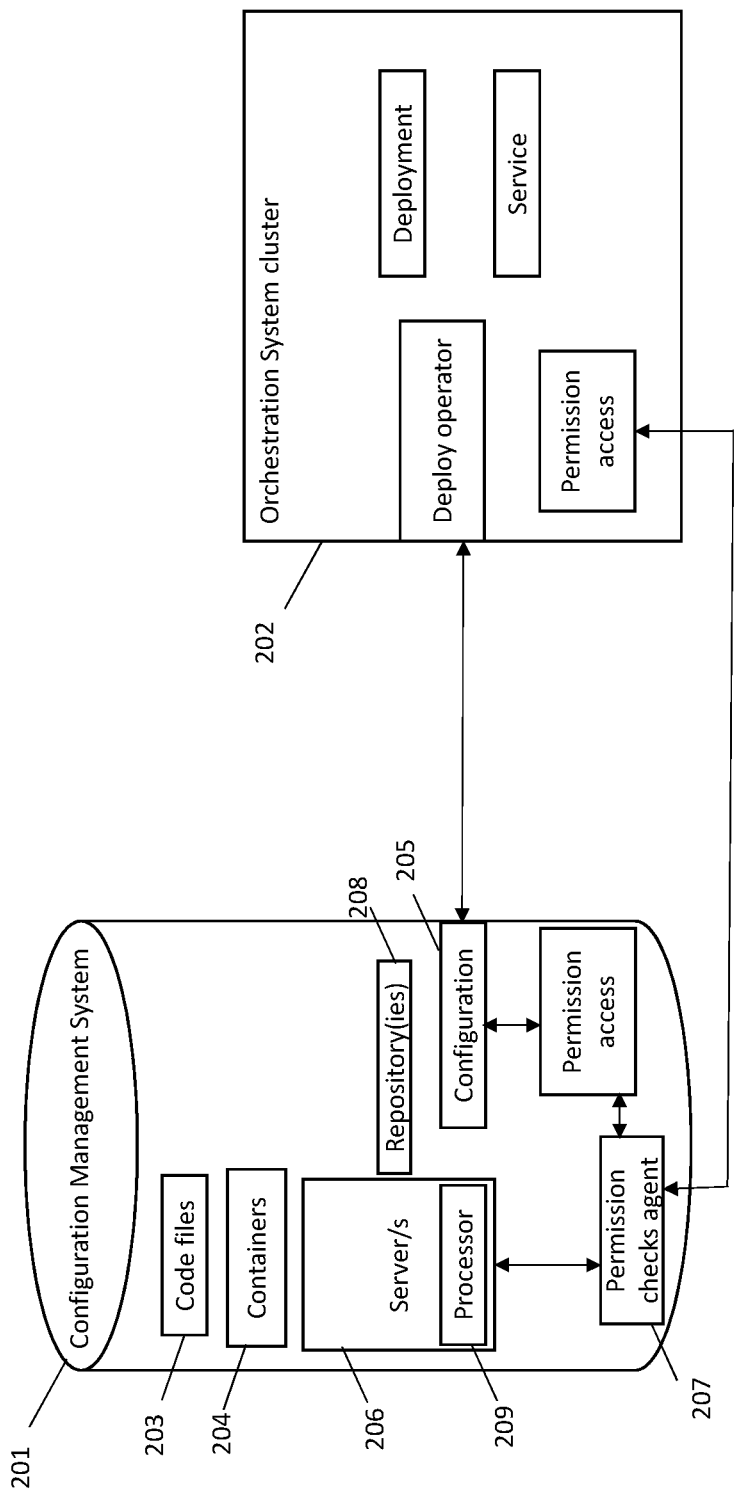
FIG. 2 schematically shows a system for checking permissions compatibility between a configuration management system and an orchestration system of a computing cluster, according to some embodiments of the present disclosure.

Reference is now also made to FIG. 2, which schematically shows a system for checking permission compatibility between a configuration system and an orchestration system of a computing cluster, according to some embodiments of the present disclosure. The configuration system 201, includes a permission checks agent 207, which is a code executed by a server with at least one processor 209, which identifies a change that was made in a code file 203 defining a configuration of the computing cluster or in a configuration file, by a user. For example, when the user adds a code line, deletes a code line or modifies a code line in the code file. The change may be identified by the permission checks agent 207, for example, by receiving a notification from the configuration system about the change. Once the permission checks agent 207, identifies there was a change in a file, which defined a configuration, the permission checks agent 207 retrieves from repositories 208, the user name or identity and the files that have been affected by the change that was made by the user. After the affected files and the name or identity of the user are retrieved, the permission checks agent 207 verifies against the orchestration system of the computing cluster 202, if the change in the file is authorized for the retrieved user according to the permission access of the orchestration system 202. The permission checks agent 207 receives either an approval response or a denial response from the orchestration system of the computing cluster 202, and updates the configuration management system according to the received response. In case the permission checks agent 207 receives an approval response, the changed file is merged to the master file and the configuration management system 201, continues with deployment of the master code and configuration to the orchestration system of the computing cluster 202. In case the permission checks agent 207 receives a denial response, the permission checks agent 207, sends a notification to the configuration management system 201, that the permission check compatibility is not approved.

Figure 3:
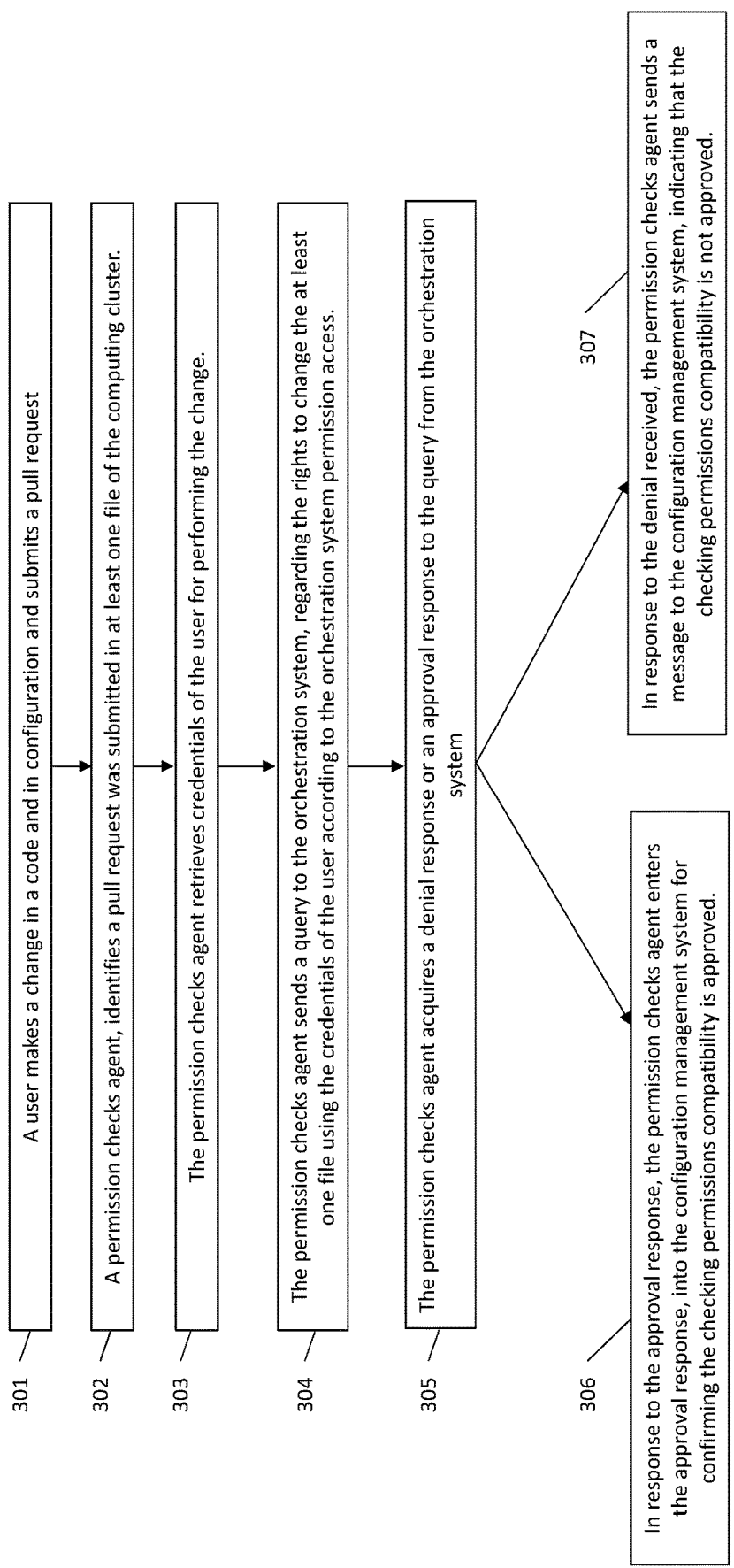
FIG. 3 schematically shows a flowchart of a process for checking permissions compatibility between a configuration management system and an orchestration system of a computing cluster, according to some embodiments of the present disclosure.

Reference is now also made to FIG. 3, which is a flowchart describing a method for checking permissions compatibility between a configuration management system and an orchestration system of a computing cluster, according to some embodiments of the present disclosure.

At 301, a user makes a change in a code file, which defined a configuration and/or in a configuration file (for example, adds a line, deletes a line or modifies a line of code) and submits the change in a form of a change request, containing one or more files. The submitted change request starts a change review flow, where changes in code files and configuration files are tested both automatically by running CI/CD tests and by being checked by other users, which review the changes to verify the changes are accurate. At 302, the permission checks agent 207, identifies a request to approve the change (e.g. the permission checks agent identifies the change request) was submitted in at least one file of the computing cluster, for example by receiving a notification from the configuration management system about a change request that was submitted. At 303, the permission checks agent 207 retrieves from a repository 208 of the configuration management system 201 an identity of the user for performing the change. At 304, the permission checks agent sends via network a query to the orchestration system 201, the query requests a right to perform the change in the file on the orchestration system 202, (and the changes in the files that have been affected by the change) using the identity of the user. At 305, the permission checks agent 207 acquires a denial response or an approval response to the query from the orchestration system for example by receiving a notification informing if the query requesting to perform the change in the file according to the retrieved user identity is approved or denied. At 306, in response to the approval response, the permission checks agent 207 enters the approval response, into the configuration management system 201 (e.g. logs back the approval to the configuration management system 201) for confirming the checking permissions compatibility is approved. At 307, in response to the denial response received by the permission checks agent 207 from the orchestration system 202, to perform the change in the file according to the retrieved user identity, the permission checks agent 207 sends a message to the configuration management system, the message is indicative that the checking permissions compatibility is not approved. The message may be sent for example to a user interface, notifying that the permission checks compatibility is not approved or the message may notify what conditions are needed for the change to be approved for the user identity (for example add or remove lines in the code file or the like). According to some embodiment of the present disclosure, the permissions checks compatibility is done during a change review flow of the configuration management system 201.

According to some embodiments of the present disclosure, the permission checks agent 207, analyzes the changed set of files to detect specific objects and operations affected by the change. Moreover, the permission checks agent 207, then checks permissions compatibility against the orchestration system, by accessing the orchestration system to verify that the retrieved user is authorized to perform the change in the orchestration system and to apply the objects and operations affected by the performed change.

According to some embodiments of the present disclosure, the permission checks agent 207, maps between user names of the configuration management system 201 and user names of the orchestration system 202 for checking permissions compatibility between the configuration management system and the orchestration system of the computing cluster. In the simpler case, user names are mapped directly. The same user name is used in both systems of the configuration management system 201 and the orchestration system 202, either through manual coordination or, preferably, using an external authentication mechanism (e.g., lightweight directory access protocol (LDAP), open ID connect (OIDC)). In a more elaborate case, the permission checks agent 207 manages a mapping from the user names of the configuration management system 201 to the appropriate principals of access permission of the orchestration system 202, using a mapping file. The mapping file may be also maintained in the configuration management system 201 and subject to similar review and approval flows of the configuration management system 201. The mapping file location may depend on the directory organization chosen for the repository 208 (e.g., a mapping file is loaded from the current directory).

According to some embodiment of the present disclosure, the permission checks agent notifies the configuration management system that the permissions check compatibility is not confirmed, by notifying the user by a user interface that the change is not approved. Alternatively, reply to the request to approve the change (e.g. the change request) with a comment or with a request for changes, which matches the permissions check compatibility. On the other hand, in response to an approval received from the orchestration system 202 for the user to perform the change, the permissions checks agent 207, may apply the change to the computing cluster.

Figure 4:
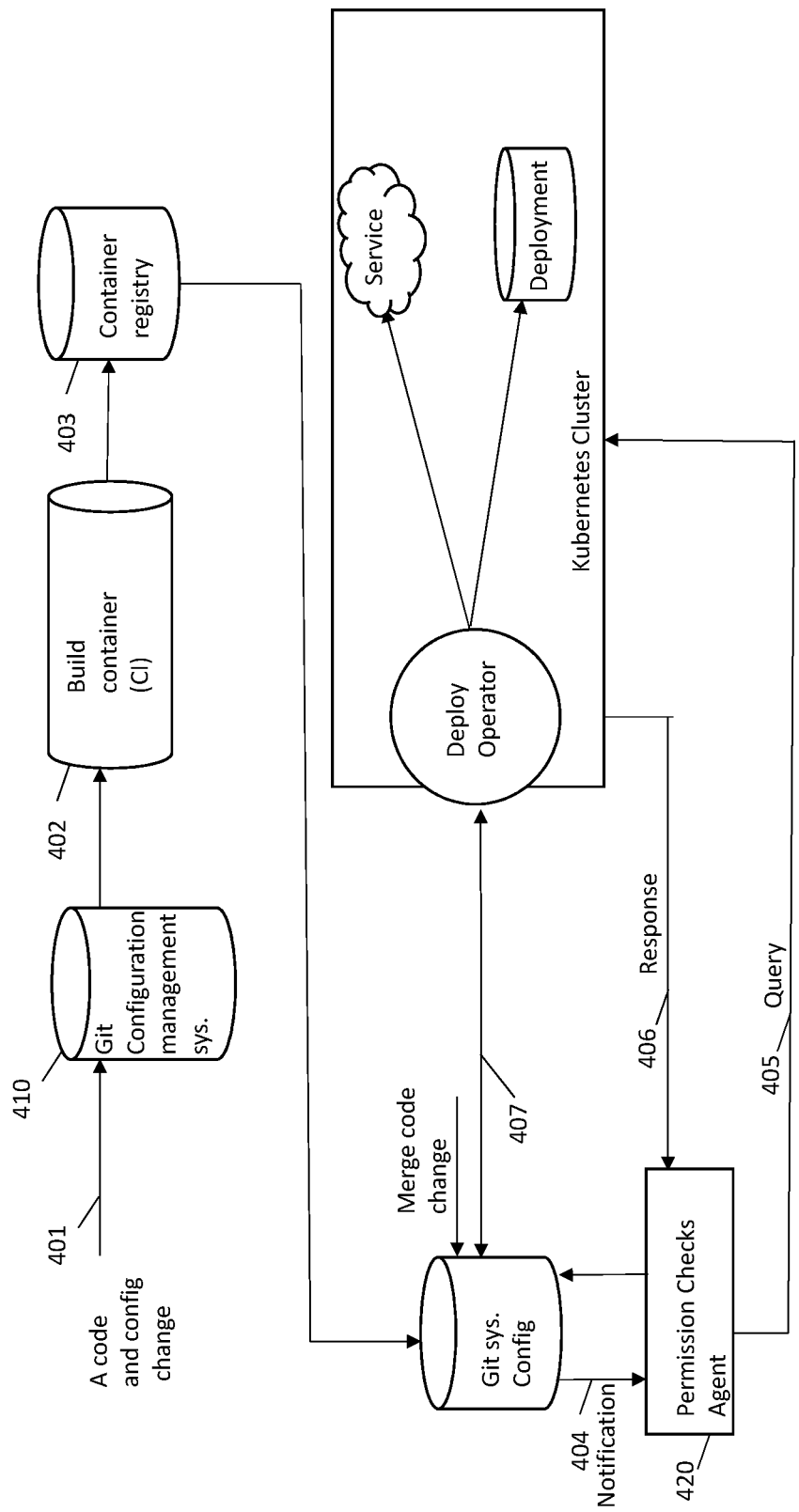
FIG. 4 schematically shows an example of a GitOps workflow for checking permissions between Git as the configuration management system and Kubernetes as the orchestrator system, according to some embodiments of the present disclosure.

According to some embodiment of the present disclosure, an example for a checking permissions compatibility between a configuration management system and an orchestration system, is a case where the configuration management system is implemented by a versioning management system and an operating model for the orchestration system such as Git and GitOps workflows and where the orchestration system is Kubernetes. For example, reference is now made to FIG. 4, which schematically shows an exemplary of GitOps workflow for checking permissions compatibility between Git as the configuration management system and Kubernetes as the orchestration system of a computing cluster.

At 401, a user makes a change in a code file defining a configuration and/or in configuration, such as adding a line, deleting a line or modifying a line in code file, and submits the change in configuration in the form of a change request (called Pull Request (PR) in Git system parlance), containing one or more files. At 402, a container is built as a continuous integration (CI) for running unit tests and integration tests verifying the code change is fine, and at 403 the container is registered and stored at a container registry. According to some embodiments of the present disclosure, at 404 a permission checks agent 420 identifies the pull request by receiving a change request notification, which is sent by Git system to the permission checks agent 420. The permission checks agent 420 retrieves the identity of the user, which triggered the change and files that were affected by the change from the Git repository located at the Git configuration management system 410. Since Kubernetes is a system, which manages objects, the objects may be encoded in a suitable format (e.g., JSON, YAML) and saved to files. The permission checks agent 420 extracts a list of Kubernetes objects that have been affected by the code change (e.g. object name, type and namespace (Namespace is a way to create logical isolation between users sharing the cluster. Namespaces are analogous to the role of directories in a file system (using the same file name in different directories is allowed)) from files along with the change type (e.g. deleted line, created line, modified). Optionally, there can be multiple changes at once, of different change types, all combined into one change set. The permission checks agent 420 determines the Kubernetes user name to be use for checking access for example by a 1:1 mapping of user names if the Git system and user names of the Kubernetes system, or by using a translation table, translating user names of the Git system to user names of the Kubernetes system. At 405, the permission checks agent 420, sends a query to the Kubernetes system regarding the rights to perform the changes by the retrieved user. The query may be sent using Kubernetes application programming interface (API) masters (e.g., by using Kubernetes operations of: dry-run, can-i, impersonating user and the like). At 406, the permission checks agent 420 receives a response from Kubernetes system and reports back authorization to the pull request and either approves or declines the pull request. At 407, eventually, after the permission checks agent 420 receives an approval for the permission checks compatibility, the pull request is merged, meaning that the change made by the user is merged to the master code file and configuration, and the GitOps tool pulls the change set into the cluster, i.e. the change is applied into the cluster.

According to some embodiments of the present disclosure, the method described herein integrates permission checks against a target cluster, and its policies, as part of testing the change in the change review flows of the Git configuration management system 410. This ensures unified and consistent access control for Git based and direct cluster access for operations, without duplicating user and access management functionality in the GitOps tool. External systems, such as the permission check agent, can request Git for notifications of changed files. The notification information sent by Git includes all information needed by the agent to identify the changes requested by the user. Git is able to notify external tooling of changes to stored files via a process called "callbacks" or "Webhooks" (e.g., a web hook to CircleCI or Travis tools). Another example is "GitHub Actions" which could also be used to run various tooling on GitHub infrastructure. In both modes, the call includes needed information about a specific commit, such as the commit identifier, branch being merged, etc. The information is sufficient to access the repository and retrieve the relevant change set (or entire branch/pull request, if so desired).

Upon receipt of a notification of a change made in a code file and in configuration, the permission checks agent 420 retrieves from the Git repository the affected files and identity of the user making the change. Once the user, which made the change, and the files affected by this change are known, the permission checks agent 420 uses existing Kubernetes functionality to verify that the objects contained in the changed files may be affected by the user responsible for the change. An example of one way of verifying it, is by using the Kubernetes command line kubectl, with the instruction create/apply/delete—server-dry-run—as <username> Another way of verifying it is using kubectl auth can-i create <object>—as <username>.

It is noted that the above examples are simplified. According to some embodiments of the present disclosure, the change made by the user to the code file and could be further analyzed to detect the affected objects and operations (e.g., added files imply kubectl create, deleted files imply kubectl delete. Finer grained analysis could be provided by analyzing the output of Git diff to determine which objects within a file are affected when a file contains multiple object definitions). Furthermore, the above description describes that all changes are applied to a default namespace, however more accurate analysis within the permission checks agent 420 may determine the namespace for each operation. This may be done by retrieving the namespace from the object metadata. The results of the above tests determine whether the change made by the user would be authorized on the cluster or not. The results may be logged back into the pull request (e.g. the results may be returned to the configuration management system and updated into the pull request), used to abort the pull request, reflected in a user interface (e.g., by posting a pull request comment), and the like.

Further to the example above, in the case of permission checks compatibility between Git and Kubernetes, it is noted that Git permissions are assigned per repository and are typically grouped into read-only (e.g., public Git access), read-write access (e.g., collaborators) and administrator (e.g., various management tasks). However, Kubernetes has several authorization mechanisms including: RBAC (Role Based Access Control)-ABAC (Attribute Based Access Control) and a Webhook to allow implementing arbitrary access control logic. For example, RBAC rules are associated to principals (users or service accounts), allowing them to operate (e.g., list, read, write, delete) on specific object types (e.g., pods, services, secret) in specific namespaces (e.g., those assigned to their team for deployment). In addition to namespace based RBAC, there are also cluster wide roles, which may grant access rights to objects in all namespaces. Through the examples related to the Kubernetes orchestration system the RBAC mechanism is used as an example access control mechanism, however, any mechanism may be used and is applicable.

According to some embodiments of the present disclosure, the permission checks agent 420 maps between Git and Kubernetes user for checking permissions compatibility between Git and Kubernetes, either with a direct 1:1 mapping or through manual coordination or, preferably, using an external authentication mechanism (e.g., lightweight directory access protocol (LDAP), open ID connect (OIDC)). In cases where the usernames are different and there are different usernames with different permission access to each user in Kubernetes, the mapping is done with a mapping file containing a translation table, which maps Git usernames to the appropriate Kubernetes principals. The mapping file may be maintained in Git and subject to similar review and approval flows. The mapping file location may depend on the directory organization chosen for the repository (e.g., a mapping file is loaded from the current directory).

According to some embodiments of the present disclosure, the permission checks agent 420 implemented in Git may run in different locations and use different runtimes. This may include any suitable mechanism that allows receiving notifications and running some user code in response. It may be CI/CD system—such as Jenkins and CircleCI, which allow running shell scripts and/or container images, and it may also be a system that is composed of functions (i.e., Function as a Service (FaaS) running on a cloud provider, on premise or as part of the code version management system).

Further to the example above, various methods may be used as the Kubernetes authorization validation, including the server-dry-run and auth can-i listed above. In addition, a manual impersonation may be used (i.e., retrieving access credentials from the cluster for a specific user).

Optionally, all the modifications on the Kubernetes cluster are made by the permission checks agent 420 using a special administrator user, which owns permission access to all types of changes in files in Git and to all types of objects and operations in Kubernetes. In addition, a manual impersonation may be used, as described above, to let the permission checks agent 420 to actually apply modifications using a specific username. According to some embodiments of the present disclosure, determination of objects affected by the configuration changes could depend on repository organization and GitOps tool being used. For example, the user could choose to represent namespaces as directories in the repository and mandate that each file includes a single configuration object. In such case, the namespace (i.e., directory) and operation (i.e. the change type: add or remove a file) are evident from the change set. Alternatively, the permission checks agent 420 would need to parse the file to detect affected objects and their namespace (e.g., when each file contains multiple objects or when a tool used does not separate namespaces by directories).

According to some embodiments of the present disclosure, in the simplest case, each repository in Git matches a specific cluster in Kubernetes (or a set of similarly configured clusters), with the access information of the target cluster, inferred from external configuration or stored in the permission checks agent 420 configuration. According to some other embodiments of the present disclosure, a user may use Git branches to represent different operating environments (e.g., test, staging, production).

According to some embodiments of the present disclosure, the permission checks agent 420 logs any validation failure, including the offending object identity (e.g., type, name, namespace). The same information may be used to update the GitOps tool storage and user interface or to provide feedback directly to the Git pull request in the form of approval or change request (if the user is marked as a reviewer/assignee), a pull request comment, and the like.

According to some embodiments of the present disclosure, in case of a permission check of a change set with changes to multiple objects, which was partially denied, (i.e. part of the changes were approved and part of the changes were denied), the permission checks agent 420 allows to apply the approved changes and the denied changed are reported via a pull request comment sent by the permission checks agent 420 to the user interface. In this case, permission checks are performed immediately before or during deployment time, i.e., only after a change is approved and merged (e.g., to the master branch in Git). Objects which pass the permission check may be successfully deployed, even when other objects fail the permission check, at the expense that invalid configuration changes are not blocked from being merged to version control. The permission checks agent 420 can use additional reporting/alerting mechanisms to notify when such undeployable objects are detected, such as Slack, PagerDuty, and the like. Alternatively, the permission checks agent 420 reports back as a comment on the Git pull request itself or by adding a (deployment) results file. The changes that were denied may be corrected in a subsequent change set, so that in this case, some critical changes are allowed to be applied sooner. In this mode, cluster state may diverge from the source of truth stored in Git. While allowed by some GitOps tools, this mode is often used in conjunction with a differencing tool to highlight deviations. In some other embodiments of the present disclosure, in case of a permission check of a change set with changes to multiple objects, which was partially denied, the whole change set is denied.

According to some embodiments of the present disclosure, in some cases, Git holds object templates and not the final object configuration that is applied (e.g., they are generated from templates using tooling such as Kustomize, and the like). In these cases, the permission checks agent 420 needs to invoke any pre-processing steps done to generate the actual and final object configuration from the template before validating access.

According to some other embodiments of the present disclosure, the destination cluster is discovered by some external tools, such as multi-cluster management tools (for example Kubernetes Federation (KubeFed) v2). In these cases, the permission checks agent 420 needs to invoke any pre-processing steps done to determinate destination cluster and after that, process the validation. If all destination clusters have the same security configurations, the validation may be done against one of the clusters.

According to some embodiments of the present disclosure, when the RBAC based verification is supported over Git artifacts, but it is desired to prevent cluster modifications with direct kubectl access, it can be implemented with external tools, such as restricted Internet protocol (IP) set of API manager clients, or a separate validation cluster (containing only API masters), requiring client authentication via transport layer security (TLS) connection or using a dedicated virtual private network (VPN) access for the permission checks agent and blocking all other public access.

According to some other embodiments of the present disclosure, a secondary verification loop may be added to allow the GitOps flow control to validate that the change-set was indeed checked for access control, as part of the pull request verification process in Git. For example, by creating some Custom Resource Definition (CRD). CRD is a way to extend Kubernetes to manage additional object types that are not part of the canonical set (e.g., Pod, Service, Deployment). A CRD defines a new object type that can be created and manipulated in Kubernetes. It comes with a control code which manages the lifecycle and actions relevant to the new type of object. a secondary verification loop may be added by creating some CRD to capture a cryptographically signed verification result of the pull request or through use of API master's audit record/access log to confirm that tests were indeed run against the cluster (using the change set of the pull request identification to correlate audit logs via request headers or similar).

According to some embodiments of the present disclosure, another example for a implementing a configuration management system is by using a specific Kubernetes cluster for configuration management only, where all objects are stored and all the changes in the objects are recorded and may be tracked. In this case, a remote cluster, accesses the specific cluster to apply changes that are relevant to it, so that a group of remote clusters access the specific cluster to apply the relevant changes to each cluster.

According to some embodiments of the present disclosure, a computer program product for checking permissions compatibility between a configuration management system and an orchestration system is disclosed. The computer program product comprises one or more computer readable storage media, and program instructions collectively stored on the one or more computer readable storage media, the program instructions comprises:

program instructions to identify a request to approve at least one change in at least one file defining a configuration of the computing cluster;

program instructions to retrieve from a repository of the configuration management system identity of a user for performing the at least one change;

program instructions to acquire a denial response or an approval response received in response to a query provisioned to the orchestration system, the query is for rights to change the at least one file using the identity of the user;

in response to the approval response, program instructions to enter the approval response, into the configuration management system for confirming the checking permissions compatibility is approved; and in response to the denial received, program instructions to send a message to the configuration management system, the message is indicative that the checking permissions compatibility is not approved.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for checking permission compatibility between a configuration system and an orchestration system of a computing cluster will be developed and the scope of the term methods and systems for checking permission compatibility between a configuration system and an orchestration system of a computing cluster, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for checking permissions compatibility between a configuration management system and an orchestration system of a computing cluster, the method comprising:

identifying a request to approve at least one change in at least one file defining a configuration of a computing cluster;
retrieving from a repository of a configuration management system an identity of a user for performing the at least one change;
acquiring a denial response or an approval response from an orchestration system received in response to a query provisioned to the orchestration system, wherein the orchestration system performs deployment functions for the computing cluster, and wherein the query is for rights to change the at least one file using the identity of the user;
in response to the approval response, entering the approval response, into the configuration management system for confirming the checking permissions compatibility is approved; and
in response to the denial received, sending a message to the configuration management system, the message is indicative that the checking permissions compatibility is not approved.

2. The method of claim 1, further comprising:
analyzing the at least one changed file to detect objects and operations affected by the change; and
checking permissions compatibility against the orchestration system, by accessing the orchestration system to verify that the retrieved user identity is authorized to perform the change in the orchestration system and to apply the objects and operations affected by the performed change.

3. The method of claim 1, further comprising mapping between user names of the configuration management system and user names of the orchestration system of the computing cluster for checking permissions compatibility between the configuration management system and the orchestration system of the computing cluster.

4. The method of claim 1, wherein the configuration management system is a versioning management system.

5. The method of claim 4, wherein the configuration management system is Git.

6. The method of claim 1, wherein the orchestration system of the computing cluster is Kubernetes.

7. The method of claim 1, wherein the configuration management system is a part of the computing cluster.

8. The method of claim 1, wherein in response to the denial received, sending a message to the configuration management system, comprises one of the following:
notifying the user by a user interface that the at least one change is not approved;
replying to the request to approve the change with a comment or with a request for changes, which matches the permissions check compatibility; or
adding a results file.

9. The method of claim 1, further comprising: in response to an approval received from the orchestration system of the computing cluster for the user to perform the at least one change, applying the at least one change to the computing cluster.

10. The method of claim 1, wherein identifying the request to approve the at least one change in the at least one file is done during a change review flow of the configuration management system.

11. The method of claim 1, wherein when a query provisioned to the orchestration system, for rights to perform multiple changes at the at least one file, and part of the changes are approved and part of the changes are denied, applying the approved part of changes to the computing cluster and notifying the user by a user interface about the part of changes that are denied.

12. An apparatus comprising:
a storage device storing at least one file; and
a processor in communication with the storage device, the processor configured to:
identify a request to approve at least one change in the at least one file defining a configuration of a computing cluster;
retrieve from a repository of a configuration management system an identity of a user for performing the at least one change;
acquire a denial response or an approval response received from an orchestration system in response to a query provisioned to the orchestration system, wherein the orchestration system performs deployment functions for the computing cluster, and wherein the query is for rights to change the at least one file using the identity of the user;
in response to the approval response, enter the approval response, into the configuration management system for confirming the checking permissions compatibility is approved; and
in response to the denial received, send a message to the configuration management system, the message is indicative that the checking permissions compatibility is not approved.

13. The apparatus of claim 12, further configured to:
analyze the at least one changed file to detect objects and operations affected by the change; and
check permissions compatibility against the orchestration system, by accessing the orchestration system to verify that the retrieved user identity is authorized to perform the change in the orchestration system and to apply the objects and operations affected by the performed change.

14. The apparatus of claim 12, further configured to map between user names of the configuration management system and user names of the orchestration system of the computing cluster for checking permissions compatibility between the configuration management system and the orchestration system of the computing cluster.

15. The apparatus of claim 12, executing the method for checking permissions compatibility between a configuration management system and an orchestration system of a computing cluster as part of the configuration management system.

16. The apparatus of claim 12, executing the method for checking permissions compatibility between a configuration management system and an orchestration system of a computing cluster as part of a Continuous Integration Continuous Deployment (CICD) system.

17. The apparatus of claim 12, executing the method for checking permissions compatibility between a configuration management system and an orchestration system of a computing cluster as part of the computer cluster.

18. A computer program product for checking permissions compatibility between a configuration management system and an orchestration system, the computer program product comprising:
one or more computer readable storage media, and program instructions collectively stored on the one or more computer readable storage media, the program instructions to:
identify a request to approve at least one change in at least one file defining a configuration of a computing cluster;

retrieve from a repository of a configuration management system an identity of a user for performing the at least one change;

acquire a denial response or an approval response received from an orchestration system in response to a query provisioned to the orchestration system, wherein the orchestration system performs deployment functions for the computing cluster, and wherein the query is for rights to change the at least one file using the identity of the user;

in response to the approval response, enter the approval response, into the configuration management system for confirming the checking permissions compatibility is approved; and in response to the denial received, send a message to the configuration management system, the message is indicative that the checking permissions compatibility is not approved.

19. The computer program product of claim 18, further comprising:
program instructions to analyze the at least one changed file to detect objects and operations affected by the change; and
program instructions to check permissions compatibility against the orchestration system, by accessing the orchestration system to verify that the retrieved user identity is authorized to perform the change in the orchestration system and to apply the objects and operations affected by the performed change.

20. The computer program product of claim 18, further comprising program instructions to map between user names of the configuration management system and user names of the orchestration system of the computing cluster for checking permissions compatibility between the configuration management system and the orchestration system of the computing cluster.

* * * * *